Feb. 17, 1942. J. H. LONSKEY ET AL 2,273,715
RIP FENCE FOR BENCH SAWS
Filed Sept. 14, 1938 2 Sheets-Sheet 2
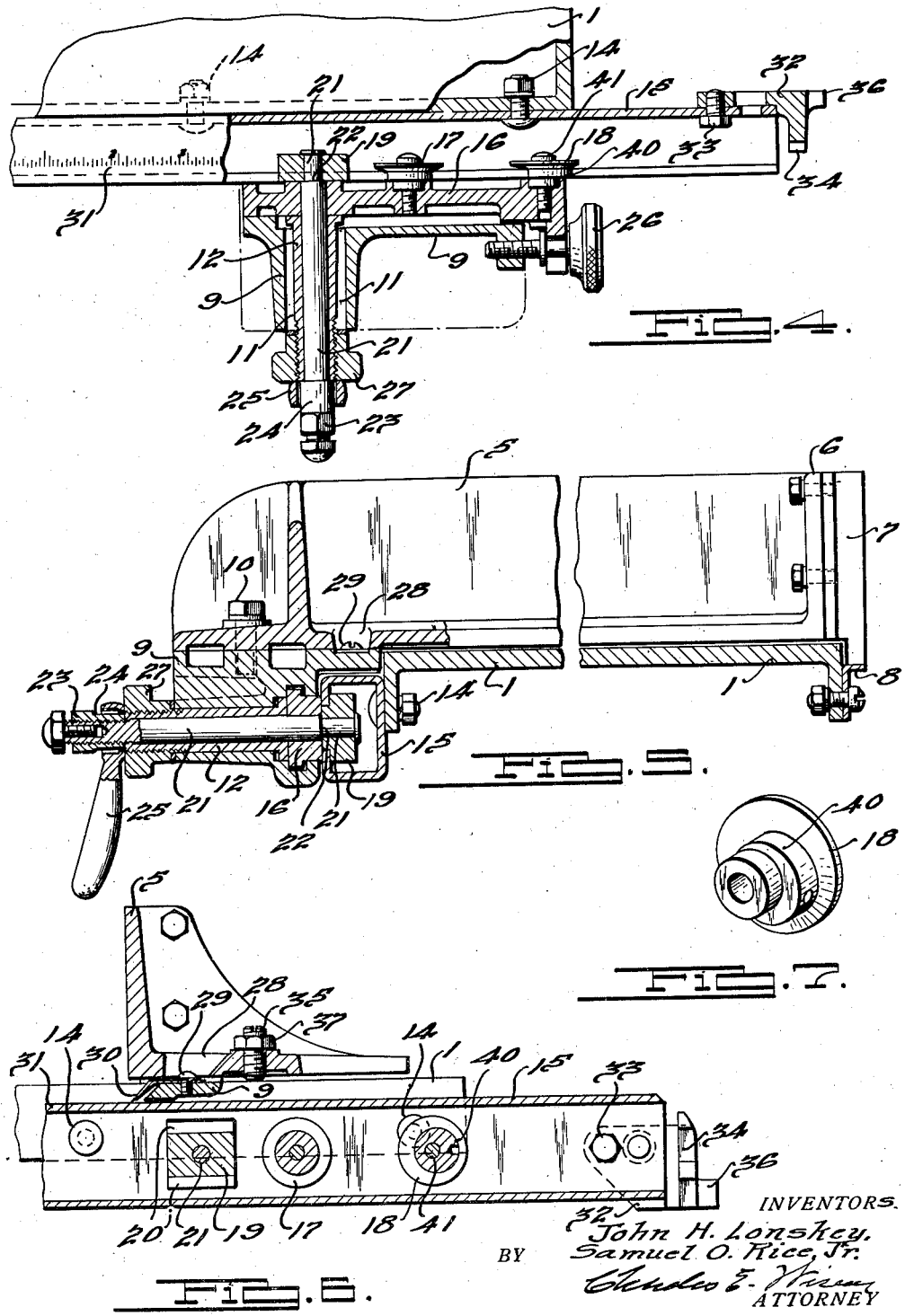
INVENTORS.
John H. Lonskey.
Samuel O. Rice, Jr.
BY
ATTORNEY Patented Feb. 17, 1942

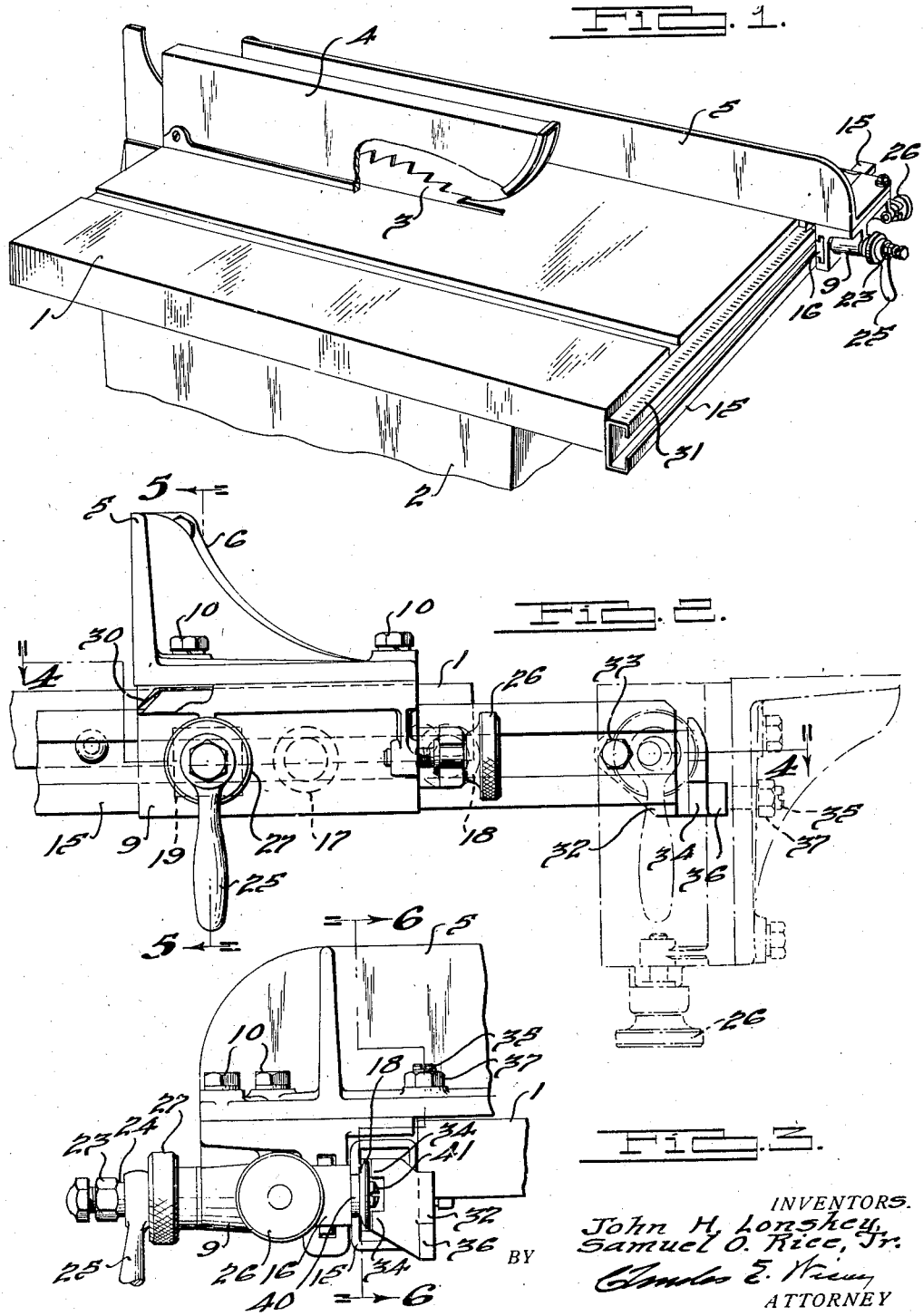

2,273,715

UNITED STATES PATENT OFFICE 2,273,715

RIP FENCE FOR BENCH SAWS

John H. Lonskey, Ypsilanti, Mich., and Samuel O. Rice, Jr., Winnetka, Ill., assignors to Central Specialty Company, Ypsilanti, Mich., a corporation of Michigan Application September 14, 1938, Serial No. 229,900

2 Claims. (Cl. 143—174)

This invention relates to rip fences for wood working machines such as bench saws, band saws and like wood working machinery and the object of the invention is to provide a rip fence which extends normally in vertical relation to the machine bed but which can be moved to the outer edge of the machine bed and turned at a right angle to provide an extension for the machine bed extending in the same plane as the bed.

Another object of the invention is to provide a rip fence which is adjustable on the saw bed in parallel relation with the saw blade and may be accurately adjusted in position.

A further object of the invention is to provide a rip fence which is adjustable at one end on a track secured to the saw bed and the opposite end of the rip fence being slidable on a guide on the opposite side of the saw bed.

Another object of the invention is to provide a rip fence which may be roughly adjusted in position and then may be accurately and finally adjusted by a thumb screw before the rip fence is finally locked in position.

A further object of the invention is to provide a bolt which acts as the axis on which the rip fence may be turned to position to provide a continuation or extension of the saw bed.

Another object of the invention is to provide a thumb screw for accurately adjusting the rip fence transversely of the saw bed and the arrangement being such that when the rip fence is turned to the plane of the saw bed the said thumb screw may be utilized to accurately adjust the face of the rip fence to the plane of the saw bed.

These objects and the several novel features of the invention are hereinafter more fully described and claimed and the preferred form of construction by which these objects are attained is shown in the accompanying drawings in which—

Fig. 1 is a perspective view of a bench saw bed equipped with my improved rip fence.

Fig. 2 is an enlarged end elevation of the rip fence and showing in dotted lines how the rip fence is turned to provide an extension of the saw bed.

Fig. 3 is a side elevation of the end of the rip fence and the adjusting mechanism therefor.

Fig. 4 is a section taken on line 4—4 of Fig. 2.

Fig. 5 is a section taken on line 5—5 of Fig. 2.

Fig. 6 is a section taken on line 6—6 of Fig. 3.

Fig. 7 is a perspective view of the carriage cam.

The saw bed 1 is shown more particularly in Fig. 1 and may be mounted on any suitable base 2. The saw disc 3 extends through a slot in the saw bed, as is the usual practice, and is provided with a safety guard 4 extending over the saw. The rip fence 5 extends across the saw bed 1 in parallel relation with the saw disc 3 in the position shown in Fig. 1. This rip fence 5 is adjustable across the saw bed and at the end 6 the rip fence is provided with a guide bar 7 shown in Fig. 5 which rides on a track or way 8 secured to the saw table 1. At the opposite end the rip fence is secured to a casting 9 shown in Figs. 2, 3, 4 and 5 by means of the bolts 10. This casting 9, as shown in Fig. 4, is provided with an elongated aperture 11 for the sleeve 12. The sleeve 12 fits the aperture 11 in vertical cross section as shown in Fig. 5 but the aperture 11 is elongated horizontally as shown in Fig. 4 for horizontal adjustment.

Secured to the edge of the saw bed 1 by means of bolts 14 is a channel shaped track 15 shown in the various figures. A carriage 16 is provided having guides 17 and 18 riding between the edges of the channel track 15 and a square slide block 19 is provided also riding between the edges of the channel guide. This slide block is shown more particularly in Figs. 4, 5 and 6 and is provided with grooves 20 to fit the edges of the channel track, as will be understood from Figs. 5 and 6. Extending through the slide block 19 is a shaft 21 and this shaft 21 also extends through the sleeve 12 and carriage 16 and is provided with a shoulder 52 at the face of the slide block. Threaded onto the outer end of the shaft 21 is a nut 22 having a reduced rounded extension 24 on which a wrench 25 is rotatable. By moving this wrench onto the nut portion 23 the said nut portion may be turned to thread the end thereof against the sleeve 12 to draw the shaft 21 to the left of Fig. 5 and clamp the channel track flanges between the slide block 19 and carriage 16. This provides for rough adjustment of the rip fence on the channel track. In fine adjustment however the nut member 23 may be loosened and at this time the thumb screw 26 may be turned to move the casting 9 longitudinally as will be understood from Fig. 4, which adjustment is allowed by the elongated aperture 11 for the sleeve 12. As the rip fence 5 is secured to the casting 9 this will move the rip fence accordingly and provide for fine adjustment of the rip fence in position.

When this adjustment has been completed the knurled nut 27, shown in Figs. 4 and 5, may be turned up to lock the sleeve 12 in position in the elongated aperture 11 and for final locking the nut member 23 may be turned up to bindingly engage the flanges of the channel track between the slide block 19 and carriage 16. In order to provide a means for showing such fine adjustment of the rip fence an opening 28 is provided in the base of the rip fence and a screw 29 is provided to secure a pointer 30 in a portion of the casting 9 shown in Fig. 6. The top face of the channel track is provided with graduations as shown at 31 in Fig. 4 and this pointer 30 will thus indicate the position of the rip fence in relation to the graduations on the channel track and by adjustment of the thumb screw 26 shown in Fig. 4 this pointer may be accurately adjusted in position and the rip fence will be adjusted to the same extent.

In order to allow for tipping the rip fence from the vertical to the horizontal position a bracket 32 is attached to the end of the channel track by a screw 33, as shown in Figs. 3, 4 and 6. This bracket is provided with lugs 34 extending over the end of the channel track and arranged to stop the slide block 19. When the slide block 19 engages the lugs 34 by movement of the rip fence to the end of the channel track the rip fence may be turned on the portion of the shaft 21 extending through the slide block 19 so that the face of the rip fence extends in horizontal position as shown in dotted lines in Fig. 2.

When the rip fence is turned to this position the set screw 35 engages the extending lug 36 on the bracket 32 as will be understood from Figs. 2, 3, 4 and 6. This set screw allows adjustment of the rip fence on the pivot provided by the bearing of the shaft 21 in the slide block 19 and thus the angularity of the face of the rip fence may be adjusted accurately to the plane of the saw bed. Also when turned to this position the nut members 23 and 27 may be loosened at which time the thumb screw 26 may be turned to adjust the entire rip fence assembly vertically by means of the elongated aperture 11 which at that time is in the vertical position as will be understood from the dotted lines in Fig. 2. Thus when the rip fence is turned to provide an extension of the saw bed it may be adjusted in angular position and may be also adjusted vertically by two separate adjustments and may be locked in these adjustments by the lock nut 37 and by the locking nuts 23 and 27 shown in Figs. 5 and 6.

The carriage is provided with two circular guides 17 and 18 as shown in Figs. 4 and 6 and these guides ride between the flanges of the channel 15. The hub 40 of the circular guide 18 is in the form of a cam as shown in Fig. 7 and is locked in position by the screw 41 shown in Fig. 4. The hub of the guide 17 is slightly smaller than the slot in the channel guide 15 so that by turning the cam 40 on the screw 41 as an axis the rear edge of the carriage may be raised or lowered on the shaft 21 as a pivot which extends through the guide block 19.

This allows the face of the rip fence to be adjusted slightly as will be understood from Fig. 6 by the raising or lowering of the carriage until the face of this rip fence is in the true vertical position. When the cam is in the position shown in Fig. 6 the carriage is in the normal position but by turning the circular guide 18 and cam 40 on the screw 41 to reposition the cam and then tightening the screw 41 the adjustment of the face of the rip fence will be readily accomplished.

From the foregoing description it becomes evident that the device is very simple and efficient in operation, provides a means for accurately adjusting the rip fence across the saw bed and in parallel relation with the saw, allows for rough and fine adjustment of the rip fence in vertical and horizontal positions and provides a device which accomplishes the objects described.

Having thus fully described our invention, its utility and mode of operation, what we claim and desire to secure by Letters Patent of the United States is:

1. In a wood working machine having a bed and a cutter, a channel track secured to one side of the bed, a carriage movable longitudinally of the channel track, a rip fence supported on the carriage and movable over the bed with a face thereof in a plane parallel with the plane of the cutter, a shaft on the carriage, means including the shaft for clamping the carriage to the channel track at any desired position, a guide member mounted on the carriage and riding in the channel track, the guide member being in the form of an eccentric and being turnable to raise or lower one end of the carriage on the shaft as a pivot, the channel track extending beyond one side of the bed and the rip fence being movable to the extending end of the channel track and turnable with the shaft to bring the said face of the rip fence to the plane of the bed.

2. A wood working machine having a bed provided with a slot and a rotatable cutter extending through the slot at a right angle to the surface of the bed, a track secured on one side of the bed at a right angle to the plane of rotation of the cutter and extending beyond an end of the bed, a carriage movable longitudinally of the track, a rip fence supported on the carriage and movable therewith across the bed with the face thereof in a plane parallel with the plane of the saw, means for releasably securing the carriage at any desired position along the track, means rotatably supporting the carriage on an axis at a right angle to the track whereby the fence and carriage when on the extending portion of the track, may be turned to position the face of the fence in a plane parallel with the plane of the bed, and means for adjusting the fence on the carriage when so turned to thereby position the face of the fence in the plane of the bed, said means for adjusting comprising screw means on the carriage interengaging with a nut portion on the fence.

JOHN H. LONSKEY.
SAMUEL O. RICE, Jr.